US010086284B2

(12) United States Patent
Darley

(10) Patent No.: US 10,086,284 B2
(45) Date of Patent: Oct. 2, 2018

(54) MODIFYING GAMEPLAY PARAMETERS

(71) Applicant: KING.COM LIMITED, St. Julians (MT)

(72) Inventor: Vince Darley, London (GB)

(73) Assignee: KING.COM LTD., St. Julians (MT)

( * ) Notice: Subject to any disclaimer, the term of this patent is extended or adjusted under 35 U.S.C. 154(b) by 59 days.

(21) Appl. No.: 15/014,480

(22) Filed: Feb. 3, 2016

(65) Prior Publication Data
US 2017/0216725 A1   Aug. 3, 2017

(51) Int. Cl.
*A63F 13/537*   (2014.01)
*A63F 13/30*    (2014.01)
*A63F 13/55*    (2014.01)
*A63F 13/533*   (2014.01)
*A63F 13/69*    (2014.01)

(52) U.S. Cl.
CPC .......... *A63F 13/537* (2014.09); *A63F 13/30* (2014.09); *A63F 13/533* (2014.09); *A63F 13/55* (2014.09); *A63F 13/69* (2014.09); *A63F 2250/1063* (2013.01); *A63F 2300/50* (2013.01)

(58) Field of Classification Search
None
See application file for complete search history.

(56) References Cited

U.S. PATENT DOCUMENTS

2014/0106876 A1\* 4/2014 Knutsson ................ A63F 13/12
463/31

\* cited by examiner

*Primary Examiner* — Robert T Clarke, Jr.
(74) *Attorney, Agent, or Firm* — Saul Ewing Arnstein & Lehr LLP

(57) ABSTRACT

A computer implemented method for modifying a limit value determining the number of moves available to a player in a level of a computer implemented game and maintaining this setting for subsequent play of the level. The method comprises using a counter to change a move count in response to a user input defining a move in the game, wherein no additional moves can be made if the number of moves made reaches a first limit value; responsive to further user input, providing a first set of further moves; and storing information associated with said first set of further moves such that when said game is played again, a number of possible moves comprises the first limit value of moves and said first set of further moves.

12 Claims, 8 Drawing Sheets

MODIFYING GAMEPLAY PARAMETERS

FIELD OF THE INVENTION

Some embodiments may relate to controlling of parameters in a computer implemented game. Some embodiments may relate to computer devices connected in a communications network with at least one server or database for storing the value of the parameters.

BACKGROUND OF THE INVENTION

There are many technical challenges and technical considerations facing designers of computer games executed on user or computer devices in which the games have a number of parameters which dictate gameplay characteristics.

It may be possible in a gameplay environments for users to make a selection as to their preferred gameplay experience. The advent of the internet, and other wide area networks, has led to a proliferation of connected user or client devices playing casual games, typically for short periods of time. It can be problematic for a user to find or even be aware of the choices or gameplay options available and to apply these preferences whenever they begin a new game or level of a game. Simply offering different gameplay characteristics as options may take no account of previous selections, or user preferences.

One technical challenge can involve allowing a game to be fun and compelling even when there is limited display resource available, such as when a game is being played on a smartphone, tablet or other minicomputer. This may mean a small screen and/or limited processing capacity and/or limited memory and/or limited power.

Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

This patent specification describes not only various ideas and functions, but also their creative expression. A portion of the disclosure of this patent document therefore contains material to which a claim for copyright is made and notice is hereby given: Copyright King.com Limited 2015 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to a first aspect, there is provided a computer implemented method, the method being performed in a computing device comprising one or more processors, a counter, at least one memory, a display configured to display computer game graphics for a computer game, the method being performed by executing computer code on the one or more processors to perform the steps of: controlling the display to show a game area, the game area having a plurality of game objects configured to be controlled in response to user input; using the counter to change a move count in response to a user input associated with at least one of the plurality of game objects defining a move of said game, wherein no additional moves can be made if the number of moves made reaches a first limit value; responsive to further user input, providing a first set of further moves; and storing information associated with said first set of further moves such that when said game is played again, a number of possible moves comprises the first limit value of moves and said first set of further moves.

The computer game may comprise a plurality of levels, said first set of further moves being provided for a particular level.

The method may further comprise storing information associated with said first set of further moves in association with information on the particular level.

The method may further comprise storing said information associated with said first set of further moves in association with identification information associated with the user.

The method may further comprise causing said information to be sent to a server for storing in a server side database.

The method may further comprise displaying a message on said display when a number of remaining moves of said first limit is a predetermined value, said message providing information associated with obtaining of said first set of further moves.

The method may further comprise displaying said message with an icon which is selectable by a user input, said first set of further moves being provided in response to selection of said icon.

The predetermined value may be zero.

The method may further comprise, in a subsequent playing of said game: controlling the display to show the game area; using the counter to change the move count in response to user input associated with at least one of the plurality of game objects making a move, wherein no moves can be made if the number of moves reaches a first limit value in addition to the first set of further moves; responsive to second further user input, providing a second set of further moves; and storing information associated with said second set of further moves such that when said game is played again a number of possible moves comprises the first limit value of moves, said first set of further moves and second set of further moves.

The first set of further moves may comprise one or more further moves.

According to a second aspect, there is provided a computing device adapted to play a computer game, the device including one or more processors, a counter, at least one memory, a display configured to display computer game graphics for a computer game, and in which the one or more processors execute computer code to perform the steps of: controlling the display to show a game area, the game area having a plurality of game objects configured to be controlled in response to user input; using the counter to change a move count in response to a user input associated with at least one of the plurality of game objects defining a move of said game, wherein no additional moves can be made if the number of moves made reaches a first limit value; responsive to further user input, providing a first set of further moves; and storing information associated with said first set of further moves such that when said game is played again, a number of possible moves comprises the first limit value of moves and said first set of further moves.

The computer game may comprise a plurality of levels, said first set of further moves being provided for a particular level.

The one or more processors may be further configured to execute computer code to perform the step of storing information associated with said first set of further moves in association with information on the particular level.

The one or more processors may be further configured to execute computer code to perform the step of storing said information associated with said first set of further moves in association with identification information associated with the user.

The one or more processors may be further configured to execute computer code to perform the step of causing said information to be sent to a server for storing in a server side database.

The one or more processors may be further configured to execute computer code to perform the step of controlling the display to display a message on said display when a number of remaining moves of said first limit is a predetermined value, said message providing information associated with obtaining of said first set of further moves.

The one or more processors may be further configured to execute computer code to perform the step of controlling the display to display said message with an icon which is selectable by a user input, said first set of further moves being provided in response to selection of said icon.

The predetermined value may be zero.

The one or more processors may be further configured to execute computer code to perform the steps, in a subsequent playing of said game, of controlling the display to display controlling the display to show the game area; using the counter to change the move count in response to user input associated with at least one of the plurality of game objects making a move, wherein no moves can be made if the number of moves reaches a first limit value in addition to the first set of further moves; responsive to second further user input, providing a second set of further moves; and storing information associated with said second set of further moves such that when said game is played again a number of possible moves comprises the first limit value of moves, said first set of further moves and second set of further moves.

According to a third aspect, there is provided a non-transitory computer readable medium encoded with instructions for controlling a computing device comprising one or more processors, a counter, at least one memory, a display configured to display computer game graphics for a computer game, and in which the instructions are executed on the one or more processors to perform the steps of: controlling the display to show a game area, the game area having a plurality of game objects configured to be controlled in response to user input; using the counter to change a move count in response to a user input associated with at least one of the plurality of game objects defining a move of said game, wherein no additional moves can be made if the number of moves made reaches a first limit value; responsive to further user input, providing a first set of further moves; and storing information associated with said first set of further moves such that when said game is played again, a number of possible moves comprises the first limit value of moves and said first set of further moves.

The computer game may comprise a plurality of levels, said first set of further moves being provided for a particular level.

The instructions may be executed on the one or more processors to perform the further step of storing information associated with said first set of further moves in association with information on the particular level.

The instructions may be executed on the one or more processors to perform the further step of storing said information associated with said first set of further moves in association with identification information associated with the user.

The instructions may be executed on the one or more processors to perform the further step of causing said information to be sent to a server for storing in a server side database.

The instructions may be executed on the one or more processors to perform the further step of controlling the display to display a message on said display when a number of remaining moves of said first limit is a predetermined value, said message providing information associated with obtaining of said first set of further moves.

The instructions may be executed on the one or more processors to perform the further step of controlling the display to display said message with an icon which is selectable by a user input, said first set of further moves being provided in response to selection of said icon.

The predetermined value may be zero.

The instructions may be executed on the one or more processors to perform the further steps, in a subsequent playing of said game, of: controlling the display to display controlling the display to show the game area; using the counter to change the move count in response to user input associated with at least one of the plurality of game objects making a move, wherein no moves can be made if the number of moves reaches a first limit value in addition to the first set of further moves; responsive to second further user input, providing a second set of further moves; and storing information associated with said second set of further moves such that when said game is played again a number of possible moves comprises the first limit value of moves, said first set of further moves and second set of further moves.

According to a fourth aspect, there is provided a computer implemented method, the method being performed in a server comprising one or more processors having access to a network and a database, the server being configured to communicate over the network with a user device adapted to play a computer game, said game having a limit value determining a maximum number of permissible moves, the method being performed by executing computer code on the one or more processors to perform the steps of: receiving from a user device a message, the message comprising user identification information and updated limit information; accessing in the database a memory location associated with the user identification information; and storing information associated with the updated limit information in the database in the memory location.

The method may further comprise: transmitting a message to the user device, said message for configuring the user device such that when said game is played again, a number of possible moves is determined by the updated limit information.

According to a fifth aspect, there is provided a server having access to a network and a database, the server being configured to communicate over the network with a user device adapted to play a computer game having a limit value determining a maximum number of permissible moves, the server comprising one or more processors configured to execute instructions to perform the steps of: receiving from a user device a message, the message comprising user identification information and updated limit information; accessing in the database a memory location associated with the user identification information; and storing information associated with the updated limit information in the database in the memory location.

The one or more processors may be further configured to execute computer code to perform the step of: transmitting a message to the user device, said message for configuring the user device such that when said game is played again, a number of possible moves is determined by the updated limit information According to a sixth aspect, there is provided a computer implemented method, the method being performed in a computing device comprising one or more processors, a timer, at least one memory, a display configured to display computer game graphics for a computer game, the method being performed by executing computer code on the one or more processors to perform the steps of: controlling the display to show a game area, the game area having a plurality of game objects configured to be controlled in response to user input making a move; using the timer to determine an amount of time elapsed during play of a level of the game, wherein no further moves can be made if the amount of time elapsed reaches a first amount of time; responsive to user input, providing a second amount of time; and storing information associated with said second amount of time such that when said game is played again, a time limit for the level comprises the first amount of time and the second amount of time.

The computer game may comprise a plurality of levels, said second amount of time being provided for a particular level.

The method may further comprise storing information associated with the second amount of time in association with information on the particular level.

The method may further comprise displaying a message on said display when an amount of time elapsed is a predetermined value, said message providing information associated with obtaining of said second amount of time.

The method may further comprise displaying said message with an icon which is selectable by a user input, said second amount of time being provided in response to selection of said icon.

The predetermined value may be zero.

The method may further comprise in a subsequent playing of said game: controlling the display to show the game area; using the timer to determine an amount of time elapsed during play of a level of the game, wherein no moves can be made if the amount of time elapsed reaches a time limit for the level comprising the first amount of time and the second amount of time; responsive to second further user input, providing a third amount of time; and storing information associated with said third amount of time such that when said game is played again a time limit comprises the first amount of time, the second amount of time, and the third amount of time.

The method may further comprise storing said information associated with said second amount of time in association with identification information associated with the user.

In one embodiment, the method further comprises causing said information to be sent to a server for storing in a server side database.

According to a seventh aspect, there is provided a computing device adapted to play a computer game, the device including one or more processors, a timer, at least one memory, a display configured to display computer game graphics for a computer game, and in which the one or more processors execute computer code to perform the steps of: controlling the display to show a game area, the game area having a plurality of game objects configured to be controlled in response to user input making a move; using the timer to determine an amount of time elapsed during play of a level of the game, wherein no further moves can be made if the amount of time elapsed reaches a first amount of time; responsive to user input, providing a second amount of time; and storing information associated with said second amount of time such that when said game is played again, a time limit for the level comprises the first amount of time and the second amount of time.

The computer game may comprise a plurality of levels, said second amount of time being provided for a particular level.

The one or more processors may be further configured to execute computer code to perform the step of storing information associated with the second amount of time in association with information on the particular level.

The one or more processors may be further configured to execute computer code to perform the step of displaying a message on said display when an amount of time elapsed is a predetermined value, said message providing information associated with obtaining of said second amount of time.

The one or more processors may be further configured to execute computer code to perform the step of displaying said message with an icon which is selectable by a user input, said second amount of time being provided in response to selection of said icon.

The predetermined value may be zero.

The one or more processors may be further configured to execute computer code to perform the steps, in a subsequent playing of said game, of: controlling the display to show the game area; using the timer to determine an amount of time elapsed during play of a level of the game, wherein no moves can be made if the amount of time elapsed reaches a time limit for the level comprising the first amount of time and the second amount of time; responsive to second further user input, providing a third amount of time; and storing information associated with said third amount of time such that when said game is played again a time limit comprises the first amount of time, the second amount of time, and the third amount of time.

The one or more processors may be further configured to execute computer code to perform the step of storing said information associated with said second amount of time in association with identification information associated with the user.

The one or more processors may be further configured to execute computer code to perform the step of causing said information to be sent to a server for storing in a server side database.

According to an eighth aspect, there is provided a non-transitory computer readable medium encoded with instructions for controlling a computing device comprising one or more processors, a timer, at least one memory, a display configured to display computer game graphics for a computer game, and in which the instructions are executed on the one or more processors to perform the steps of: controlling the display to show a game area, the game area having a plurality of game objects configured to be controlled in response to user input making a move; using the timer to determine an amount of time elapsed during play of a level of the game, wherein no further moves can be made if the amount of time elapsed reaches a first amount of time; responsive to user input, providing a second amount of time in addition to said first amount of time; and storing information associated with said second amount of time such that when said game is played again, a time limit for the level comprises the first amount of time and the second amount of time.

The computer game may comprise a plurality of levels, said second amount of time being provided for a particular level.

The instructions may be executed on the one or more processors to perform the further step of storing information associated with the second amount of time in association with information on the particular level.

The instructions may be executed on the one or more processors to perform the further step of displaying a message on said display when an amount of time elapsed is a predetermined value, said message providing information associated with obtaining of said second amount of time.

The instructions may be executed on the one or more processors to perform the further step of displaying said message with an icon which is selectable by a user input, said second amount of time being provided in response to selection of said icon.

The predetermined value may be zero.

The instructions may be executed on the one or more processors to perform the further steps, in a subsequent playing of said game, of: controlling the display to show the game area; using the timer to determine an amount of time elapsed during play of a level of the game, wherein no moves can be made if the amount of time elapsed reaches a time limit for the level comprising the first amount of time and the second amount of time; responsive to second further user input, providing a third amount of time; and storing information associated with said third amount of time such that when said game is played again a time limit comprises the first amount of time, the second amount of time, and the third amount of time.

The instructions may be executed on the one or more processors to perform the further step of storing said information associated with said second amount of time in association with identification information associated with the user.

The instructions may be executed on the one or more processors to perform the further step of causing said information to be sent to a server for storing in a server side database.

According to a ninth aspect, there is provided a computer implemented method, the method being performed in a server comprising one or more processors having access to a network and a database, the server being configured to communicate over the network with a user device adapted to play a computer game having a time limit value determining a maximum amount of time, the method being performed by executing computer code on the one or more processors to perform the steps of: receiving from a user device a message, the message comprising user identification information and updated time limit information; accessing in the database a memory location associated with the user identification information; storing information associated with an updated time limit information in the database in the memory location.

The method may further comprise: transmitting a message to the user device, said message for configuring the user device such that when said game is played again, a time limit is determined by the updated time limit information.

According to a tenth aspect, there is provided a server having access to a network and a database, the server being configured to communicate over the network with a user device adapted to play a computer game having a time limit value determining a maximum amount of time, the server comprising one or more processors configured to execute instructions to perform the steps of: receiving from a user device a message, the message comprising user identification information and updated time limit information; accessing in the database a memory location associated with the user identification information; storing information associated with an updated time limit information in the database in the memory location.

The one or more processors may be further configured to execute computer code to perform the step of: transmitting a message to the user device, said message for configuring the user device such that when said game is played again, a time limit is determined by the updated time limit information.

BRIEF DESCRIPTION OF DRAWINGS

To understand some embodiments, reference will now be made by way of example only to the accompanying drawings, in which.

DETAILED DESCRIPTION OF SOME EMBODIMENTS

Figure 1:
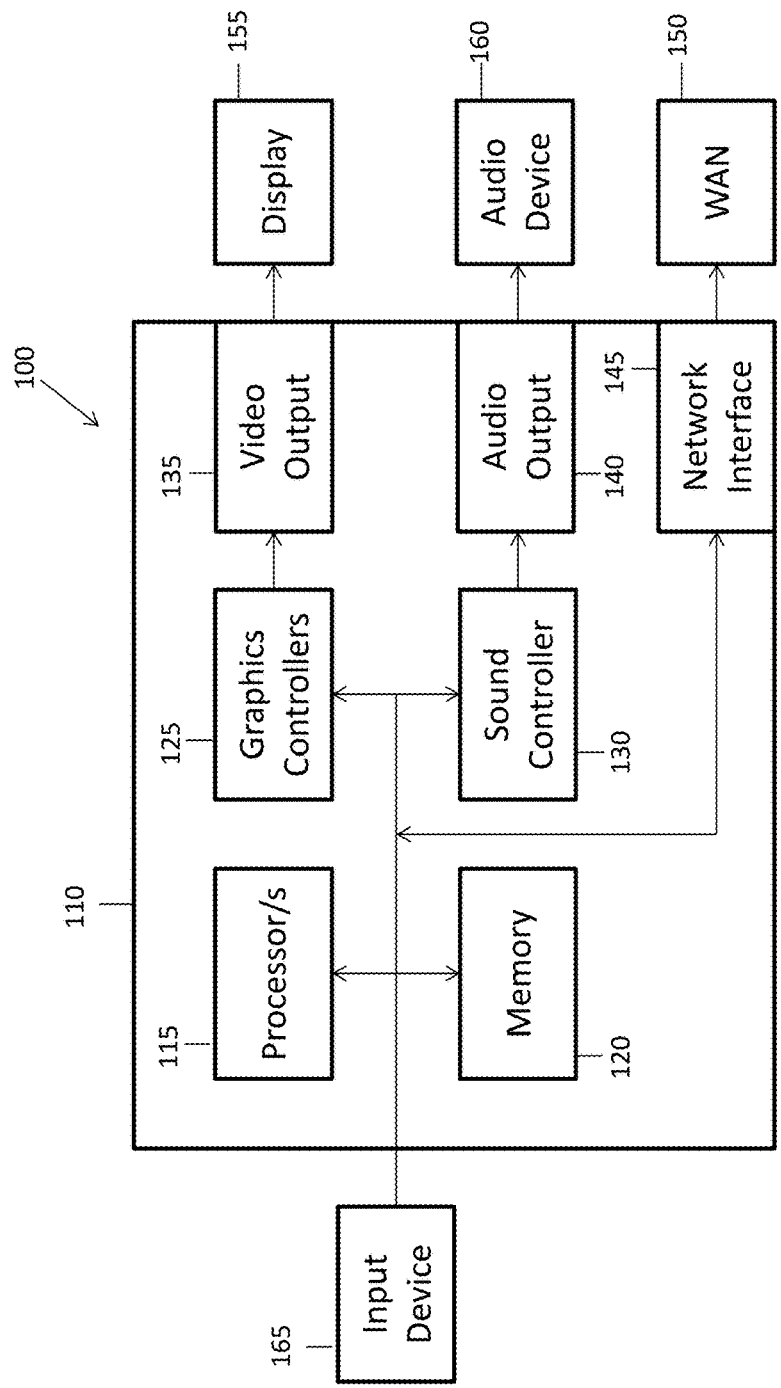
FIG. 1 shows an example client or user device of an embodiment.

A schematic view of a client or user device 100 according to an embodiment is shown in FIG. 1. All of the blocks shown are implemented by suitable circuitry. The blocks may be implemented in hardware and/or software. The user device may have a controller 110. The controller 110 has one or more processors 115 and one or more memories 120. The controller 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The blocks of the controller 110 are configured to communicate with each other by an interconnect, such as a bus or any other suitable interconnect and/or by point to point communication.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 3:
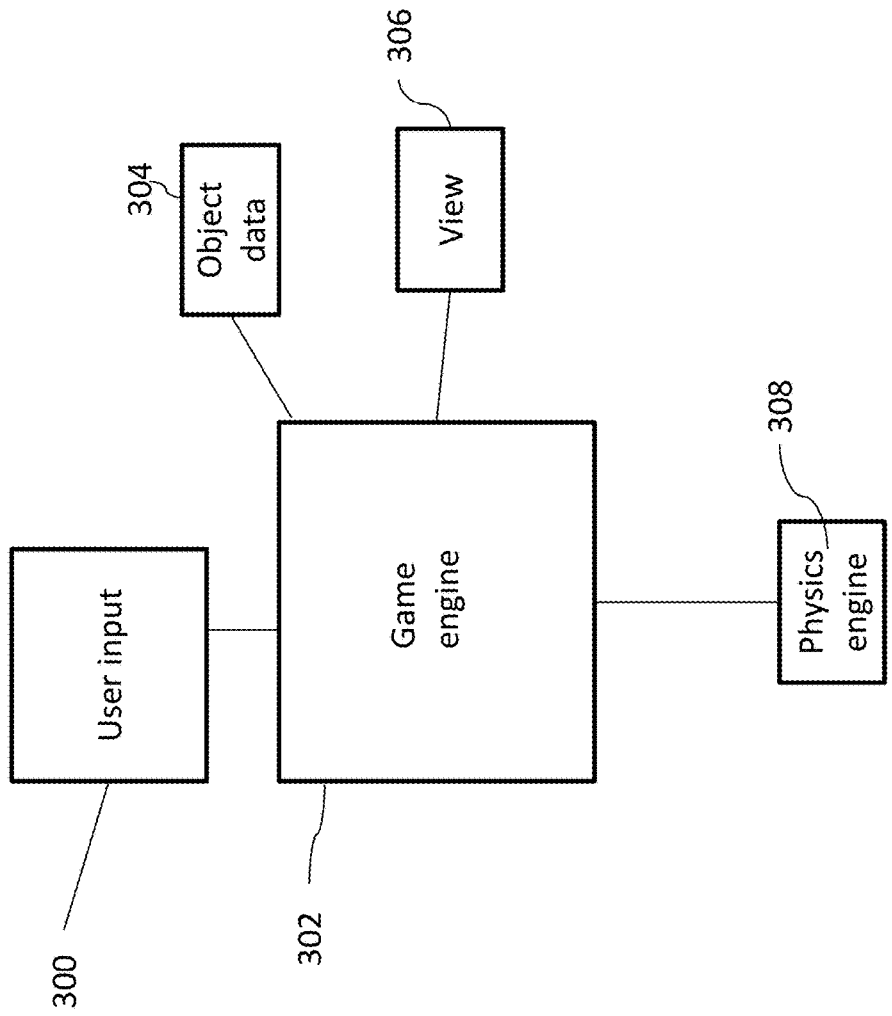
FIG. 3 illustrates a schematically shows the functional blocks of an embodiment, which may enable game play.

Reference is made to FIG. 3 which schematically shows the functional blocks of an embodiment, which may enable such game play. A user input block 300 is shown. This captures the user input and feeds the input to a game engine 302. This user input can be via any suitable user interface, such as these discussed earlier.

The game engine 302 will process the information provided by the user input. The game engine 302 (for example a game model) will determine if a valid combination has been made.

Each object has object data 304 associated therewith. The object data 304 may be stored in any suitable memory location. In some embodiments, the object data 304 may be considered to be part of the game engine and in other embodiments may be considered to be outside the game engine. The object data 304 may provide information as to the properties of an object. These properties can include attribute information such as colour and/or whether or not an object has a particular function such as a so-called booster function. The object data 304 may include the position data, that is, information representing the position of the object in the displayed image.

In some embodiments, the game engine 302 will check if the game object satisfies the rule or rules for a valid match or game condition. The rule or rules define whether or not a match or game condition has been satisfied. The match or game condition will be dependent on the game.

Thus, the game engine 302 will be in control of the matching or game mechanism. The game engine 302 will have access to data for each object including its position and the at least one characteristic associated with the object, and will be able to determine if a match or game condition has been met. If a match or game condition is met, the objects may be removed from the game area.

A physics engine 308 is provided which is configured to control the movement of moving objects on the display 155, for example the game objects in the arrangement or the player object. A player object may be a game object which is displayed moving along a determined target path. The physics engine 308 may manage the movement of an object based on, for example, gravity which controls the falling of the object, a wave mechanism, collision detection, when the falling object hits another object and optionally rotation calculations when the falling object rolls, for example, down the side of the other objects. The physics engine 308 may manage the movement of an object in dependence on a determined target path.

The movement of the object is thus controlled by the physics engine 308, which will control the movement of objects in the game area.

The physics engine 308 may be part of the game engine 302 or separate therefrom. In some embodiments, the physics engine function may be provided by a physics engine in conjunction with another function, separate to the physics engine 308.

A view function 306 uses the object data to provide the displayed image with which the user is able to view and/or interact.

The functions of FIG. 3 may be provided by one or more of the blocks of FIG. 1.

Figure 2:
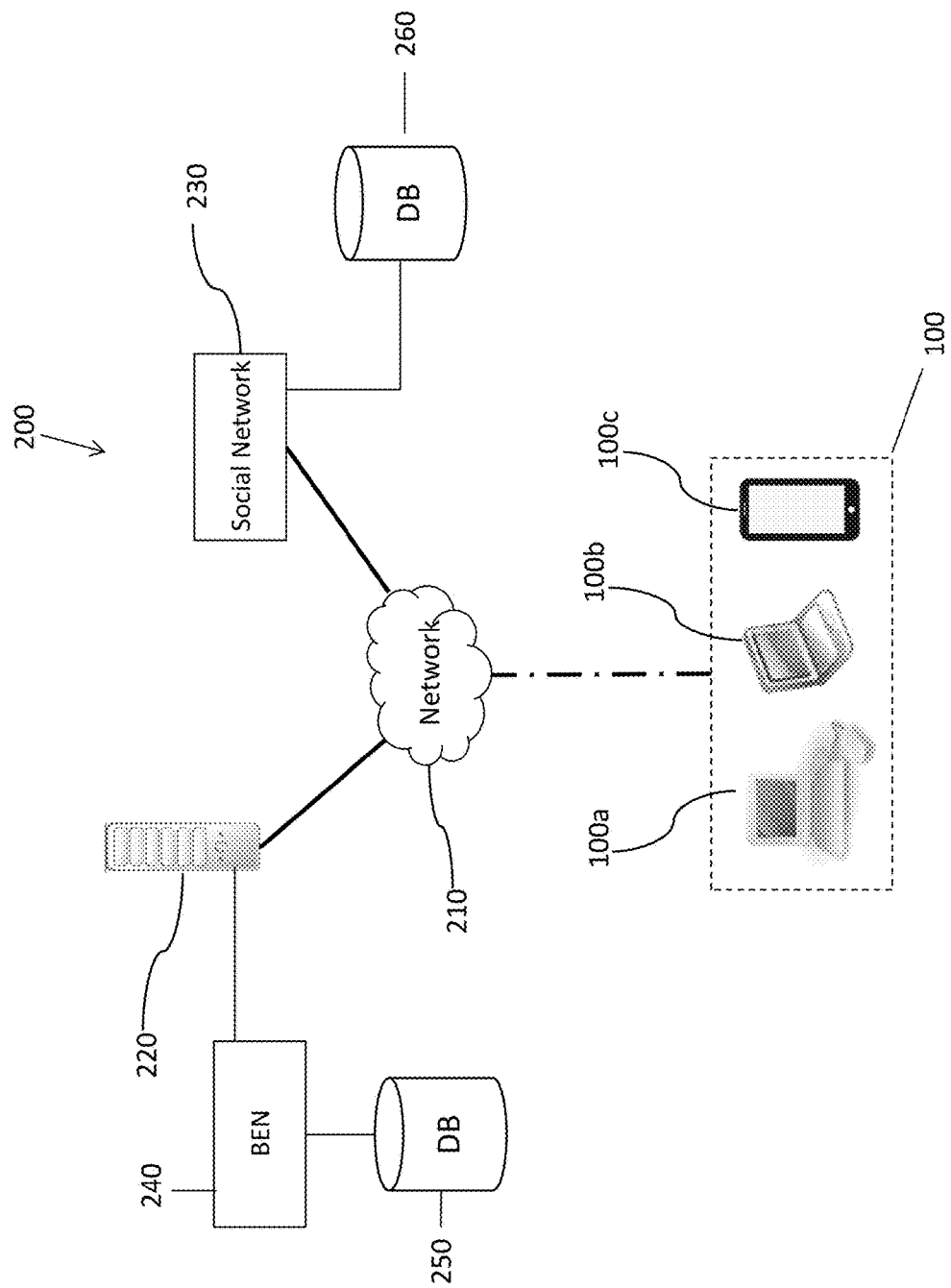
FIG. 2 illustrates an example system in which some embodiments may be provided.

FIG. 2 schematically shows a system 200 according to some embodiments. The system 200 comprises a server 220 which may, in some embodiments, communicate with a database 250 through back end infrastructure 240 "BEN". In an alternative embodiment, the database 250 may be provided within the server 220. The database 250 may store, amongst other things, gameplay data, game player's details, profiles, statistics, etc. In practice, one or more databases 250 may be provided. Where more than one server 220 is provided, the database(s) 250 may be provided in one database 250 or across two or more servers 220, 310. The server 220 may also have a games data function. This may comprise one or more units of memory to store the computer game program and user behaviour data, and a processor to run the games program and process the user behaviour data.

The server 220 may communicate via network 210 (for instance the internet) to one or more user devices 100, shown in the figure by way of example as user devices 100a, 100b and 100c, and may further provide connections to a social network 230 such as Facebook™.

It should be appreciated that embodiments may be deployed in different system architectures. For example, the computer game may be implemented as a computer game that is stored in the memory 120 of the user device 100 and is run on the processor 115 of the user device 100. However, the server 220 may handle some elements of the game in some embodiments. By way of example only, a Java game applet may be provided to the user device 100 and the locally running Java applet will generate, for example, the graphics, sounds, and user interaction for the game play on the user device 100. Some data may be fed back to the server 220 to allow interaction with other players. The data which is fed back may also allow scoring and/or cross platform synchronization.

The game may be accessed through a user account, which associates user ID information—such as one or more of username or names, one or more passwords, or the like—with one or more parameters that determine aspects of gameplay. This information may be stored at a server 220 which the user device 100 connects with in order to download the one or more parameters. To access the game, the user device will provide login details, which may comprise account identification information. The account identification information may comprise a user name and password, in some embodiments. The account identification information may be transmitted from the user device 100 to the server 220 through the WAN 150.

The server may use the account identification information as a key into the database 250 (and/or other suitable database) to retrieve the parameters associated with the account identification information and transmit these parameters to the user device. The user device may store these parameters in local memory 120. The user is then able to play the game having particular gameplay characteristics as determined by the parameters.

Additionally or alternatively, the parameters may be permanently stored at the user device 100 itself. In this case, there may be no need to access to access a remote server in order to load the parameters associated with the user account so as to enable gameplay.

In some embodiments, the game may be played as a stand-alone game on the user device. In these embodiments, the parameter will be stored in the memory of the user device.

Figure 8:
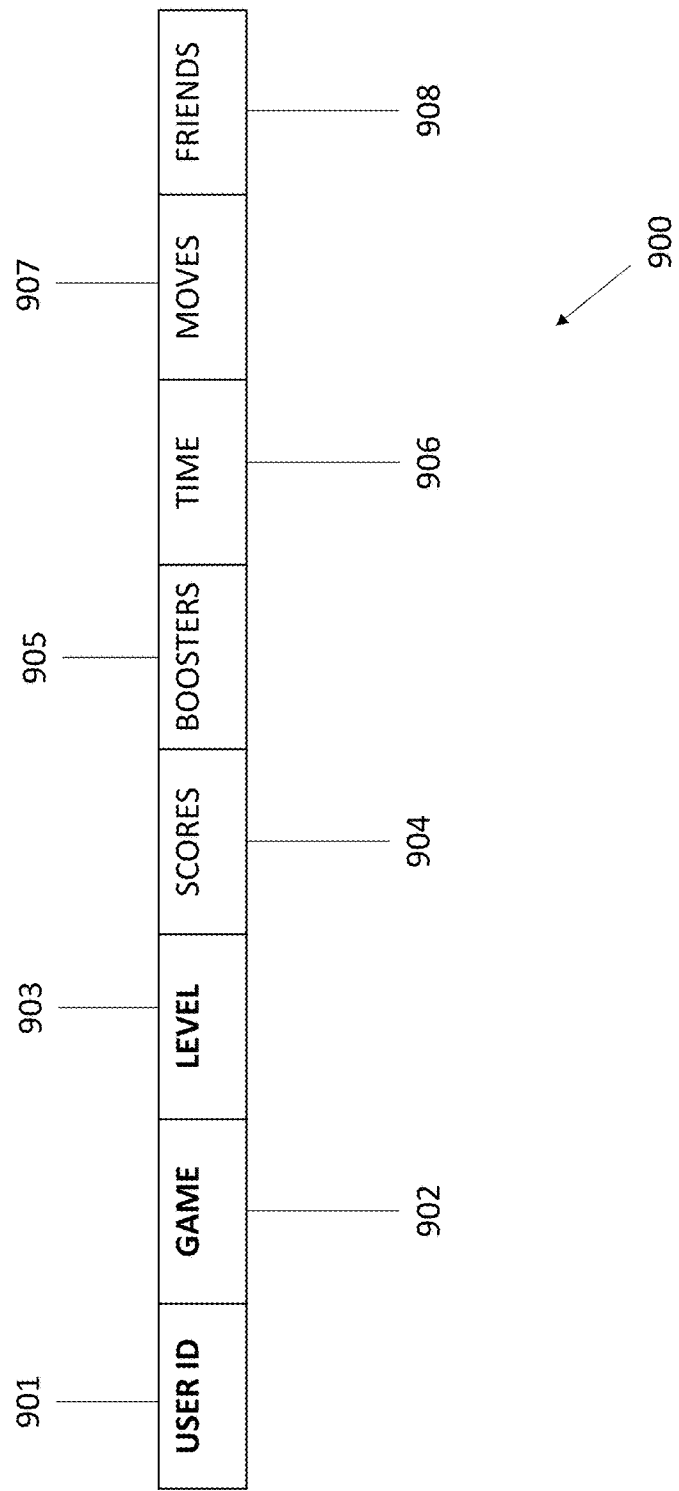
FIG. 8 illustrates an example of a data structure that may be used to store a set of parameters associated with a user account for determining gameplay characteristics.

An example of a data structure 900 for storing a set of parameters that may be stored in database 250 and/or memory 120 is shown in FIG. 8. This data structure comprises a user ID 901, an indication of the game 902 which the data structure is associated with, and an identification of the level 903 of the game that the data structure is associated with. These three elements of the data structure 900 may be used to identify the data structure and the parameters contained therein as being associated with a particular user account, a particular game and a particular level of the game. It should be appreciated that in some embodiments, the data structure may include information associated with more than one level of a game. In these embodiments, different fields may be provided for each level. Alternatively, a field may comprise information about one or more levels in a given field.

In alternative embodiments, the data structure may comprise game information for a plurality of different games.

The data structure comprises scoring information 904 associated with the level. This may, for example, be high scores of the user of the device and/or the high scores of one or more friends of the user. In some embodiments, the high scores may be in one or different fields to the high scores of the user of the device.

The data structure 900 comprises information regarding boosters 905 that may be used by a player, and information identifying one or more friends 908 of the user.

The data structure 900 further comprises a time limit 906, and/or a move limit 907, which determine the amount of time and/or moves available to the user in which to complete the level of the game. It should be appreciated that one or other of the time limit and move limit field may be omitted in some embodiments. For example some games may have no time limit but only a move limit or vice versa. Other games may have for each level a time limit or a move limit. In some embodiments, the time limit and/or move limit may be specific to a particular level. The move or time limit may be stored in conjunction with level information.

It should be appreciated that one or more of the fields shown in FIG. 8 may be omitted. It should be appreciated that one or more fields may be combined into a same field. It should be appreciated that one or more fields may in fact be provided by two or more fields. Finally, one or more additional fields may be alternatively or additionally be provided.

In some embodiments, the user account may take the form of a social network account identified by social network account identification information. In this case, the user device may log the user in, using their social network account details and access the game through the social network site. The user device may transmit account identification information through the network 210 to a social network 230. In one embodiment, the parameters determining gameplay characteristics may be stored at a database 260 associated with the social network 230. The database 260 may comprise social network user account information, such as friends, photos, posts, etc. The social network user account information may alternatively or additionally comprise the parameters. The account identification information, which is received at the social network 230 may then be used as key into a database 260 to retrieve the parameters associated with the account identification information. This information may be transmitted through the network 210 to the user device 100.

In an alternative embodiment, accessing the social network using the account identification information provides access to game parameters stored in an alternative location such as database 250.

One of the parameters determining aspects of gameplay may be a value determining a total number of moves that may be made by a player of the game during play of a level—which may be referred to as a "limit value". There is a default value and is provided for all players of the game. This default value may be provided as part of the game code.

In some embodiments, the default value may not be provided as part of the data structure. In some embodiments, the data structure will only store for a given level a limit value if that differs from the default value. If a user has no user specific limit values, then the respective field in the data structure may be omitted or be empty.

In other embodiments, the default value may be provided as part of the data structure.

As will be described in more detail, a limit value for particular level may be modified for a user. This new limit value will be used anytime the user plays that level, unless that limit value is altered again (if permitted). The user specific limit values may be stored in the database 250 and/or other data store. The user specific limit value may be stored at move limit 907 of data structure 900. Any user specific limit values for each level may be transferred, in addition to other parameters, from the database 250 to the user device and stored in memory 120 upon loading or synchronising of the game.

Alternatively, the user device 100 may transmit a request over the network 210 to the server 220 for a limit value associated with level when the level is loaded. The server 220 may be configured to respond to this request by retrieving the limit value associated with the level from the database 250 and returning it to the user device 100 for storage in memory 120 and application in the associated level.

It would be understood by the skilled person that the user account may take any form in which information associated with the user account comprises parameters. The user account may be associated with a unique user device and/or unique user account identification information.

In some embodiments, the game information associated with the user account which is stored in the database 250 is synchronised with the game information stored in the memory 120 of the user device 100 or vice versa. This synchronisation may be periodic or occur in response to a particular game event, e.g. the loading of a new level of the game.

In some embodiments a request for synchronisation sent from the user device 100 may comprise one or more timestamps indicating the time at which one or more parameters stored in the memory 120 were last updated. The server may be configured to compare these time stamps contained in the request to corresponding timestamps stored in the database indicating the time at which corresponding parameters stored in the database 250 were last updated. The server may then be configured to overwrite any parameters stored in the database 250 for which a later update is available in the memory 120 of the user device 100 with values of the parameters received from the user device 100.

The server may be configured to retrieve any parameters from the database 250 for which earlier versions to be overwritten are present in the memory 120 of the user device and transmit those parameters from the database to the user device. The processor 115 of the user device 100 may then be configured overwrite the earlier versions of the parameters stored in memory 120 with the parameters received from the server 220. It is thereby ensured that, after the synchronisation process has been completed, that the parameters—such as the user specific limit value information for a level—that are stored in the memory 120 and the database 250 are the latest versions of the parameters.

In some embodiments, the message instructing an update to the total number of moves available for a level may be transmitted to the server from a first device 100a. A second device 100c, associated with the same user account as the first device 100a and configured to run the same game, may then be configured to transmit a synchronisation request to a server, which may be server 220 or an additional server, the request comprising user account identification information. The server may respond to this request from the second device 100c by accessing a memory location associated with the user account identification information—which may be database 250 or an additional database—retrieving the user specific limit value information and transmitting user specific limit value information to the second device 100c. The new value representing the user specific limit value information may be stored in a memory of the second device 100c in association within the level and used by the second device 100c to determine the maximum number of moves permitted for the same level. The first and second device may be of different platforms. For example, the first device 100a may be a PC, whereas the second device 100c may be a smartphone. Hence, the user specific limit value information for a level may be maintained across a plurality of platforms.

Figure 4:
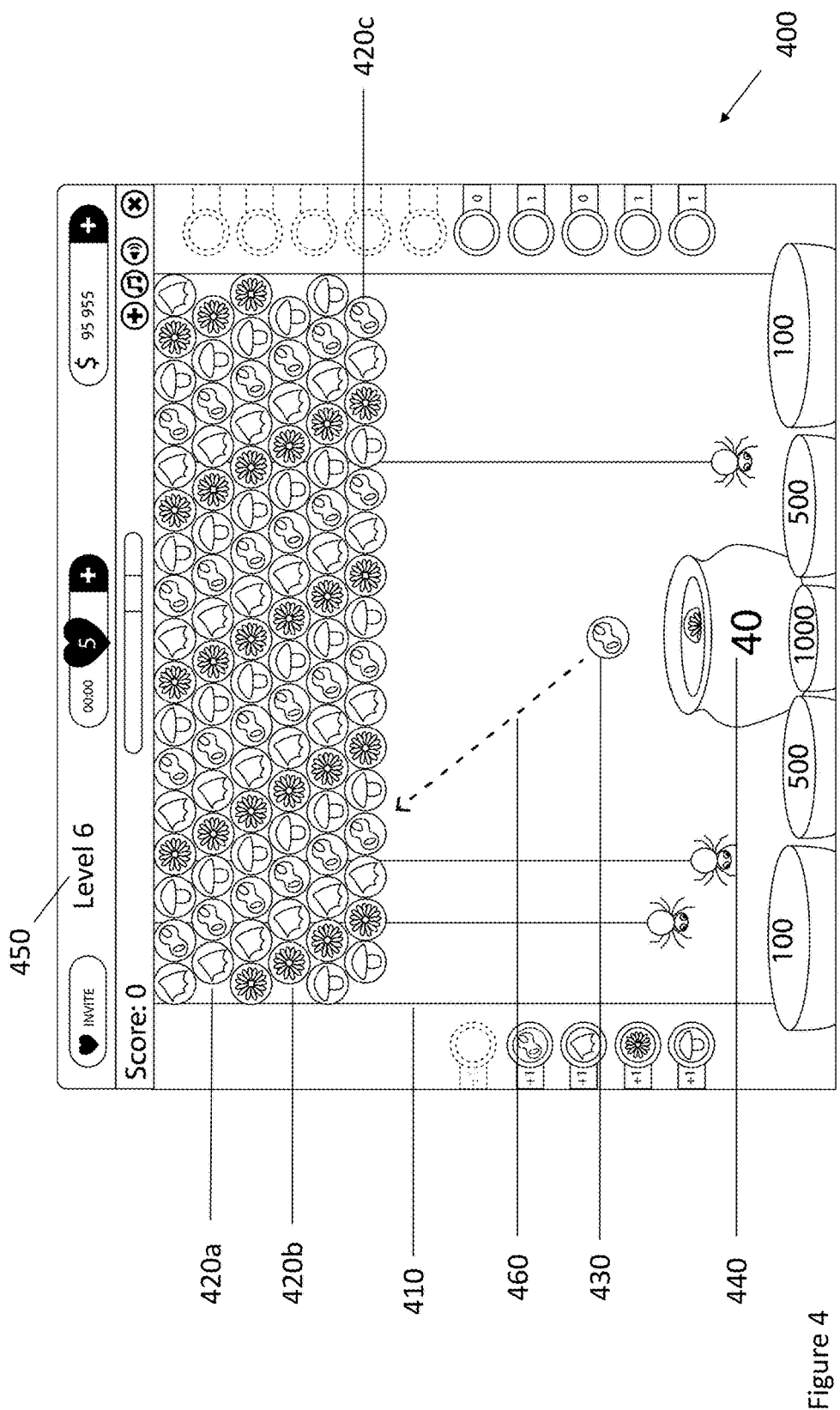
FIG. 4 depicts an example game screen showing a level of a game according to an embodiment.

FIG. 4 shows an example level of a game in accordance with some embodiments. The level 400 has a game board 410 shown on the display 155 of user device 100. Shown of the game board are a series of game objects of different types 420a, 420b, and 420c. The user of the device has control over a projectile 430, which is aimed by the user using, for example, touch input or mouse input or other pointing device input. The processor 115 uses the game engine 170, which is stored in the memory 120 of the device, to determine the changes to be made to the projected trajectory 460 of the projectile 430 on the basis of the user input. The processor may receive user input from the input device 165 and then calculate a new trajectory for the projectile 430 on the basis of this user input and game engine data loaded from the memory 120. After determining the appropriate response on the basis of the input and the game engine 170, the processor may then signal the graphics controller 125 which causes the display 155 to show the modification of the trajectory 340.

In response to user input, the processor 115 controls the display 155 to show the projectile 430 move across the gameboard and make contact with one of the game objects shown at the top of the gameboard. If the projectile is of a type, which causes a match of 3 or more different game objects of the same type to be created, then the matched game objects will be removed from the gameboard. For example, the projectile 430 shown in FIG. 4 displays a pattern which matches the pattern shown on the game object 420c. If the projectile contacts this game object 420c, the elements in the resulting match will be removed from the gameboard.

Above the gameboard is shown an indication 450 of the level of the game currently in play. In this case the level is level 6. Each level of the game may have a plurality of characteristics, dictated by a plurality of parameters. These characteristics are exhibited by a level each time the user plays that level. For example, one characteristic of a level of the game may be the initial arrangements of the game objects 420 on the game board 410 each time a level of the game is played. Another particular characteristic of a level of the game may be the total number of moves available to the player when playing a level of the game.

It should be appreciated that embodiments are not limited to games having a game have a plurality of levels. In some embodiments, the game may not be divided into a plurality of separate levels. In this case the parameters which determine the characteristics for that level may determine the characteristics for the entire game.

In one embodiment, at least one processor is configured to determine if there is a user specific limit value of the level being played. If so the user specific limit value is used by the game engine to configure and set up the game to be played. If not the game engine will use the default limit value. In some embodiments, where there is a user specific limit value, that will be stored with game data for a particular level so that each time that level is played, the user specific limit value will be applied.

In some embodiments, on loading the game application or a level of the game, the processor 115 may generate a request for one or more of the parameters which determine the characteristics of one or more levels of the game. This request may be transmitted via network interface 145 over WAN 150 to the server 220, which retrieves the requested parameters from the database 250 and returns these values to the user device 100. The requested parameters may then be loaded into memory 120 and used in the execution of the computer program instructions to determine the characteristics of one or more levels of the game.

During play of a level of the game, a value representative of the number of remaining available moves that may be made by the player during play of a level of the game may be stored. When the input device 165 receives user input and the processor determines that a projectile is to be fired onto the game board, a counter provided by the user device may update the number of available moves to take account of the change. This update may comprise decrementing a value stored in memory 120, the value representing the number of moves available. Alternatively, this update may comprise incrementing a value stored in memory representing the number of moves already made. In some embodiments, the counter function may be provided by the processor 115 of the device which may be configured to access data stored in the memory 120 and update it to indicate that the number of moves available has decreased. In other embodiments counter hardware (not shown) is provided to update the data upon the user making a move in the game.

If the number of available moves reaches zero, the player is not permitted to make any further moves on the level until the level is restarted. In some embodiments, if the number of available reaches zero, the level of the game may automatically end. A graphical representation of the number of available moves remaining is shown displayed on the screen in FIG. 4 as value 440.

It should be appreciated the game which is shown in FIG. 4 is just one example of a game. In other embodiments, different games may be provided. It should be appreciate that what defines a move may differ between games. In some embodiments different criteria may be considered to a move. In the example of FIG. 4, each time a projectile is fired in response to user input, this is considered to be a move. In a linker based game, each time a user makes a valid link may be considered a move. In a switcher based game, each time a user makes a valid switch may be considered to be a move. In a slider based game, each time a user makes a valid slide, this may be considered to be a move. In a solitaire based game, each time a user takes a card from a card stack may be considered to be a move. These are only a few example of what constitutes a move.

Generally a game will be associated with rules which define what user input constitutes a move. Some embodiments have a given number of moves in which to try to achieve a game objective.

Figure 5:
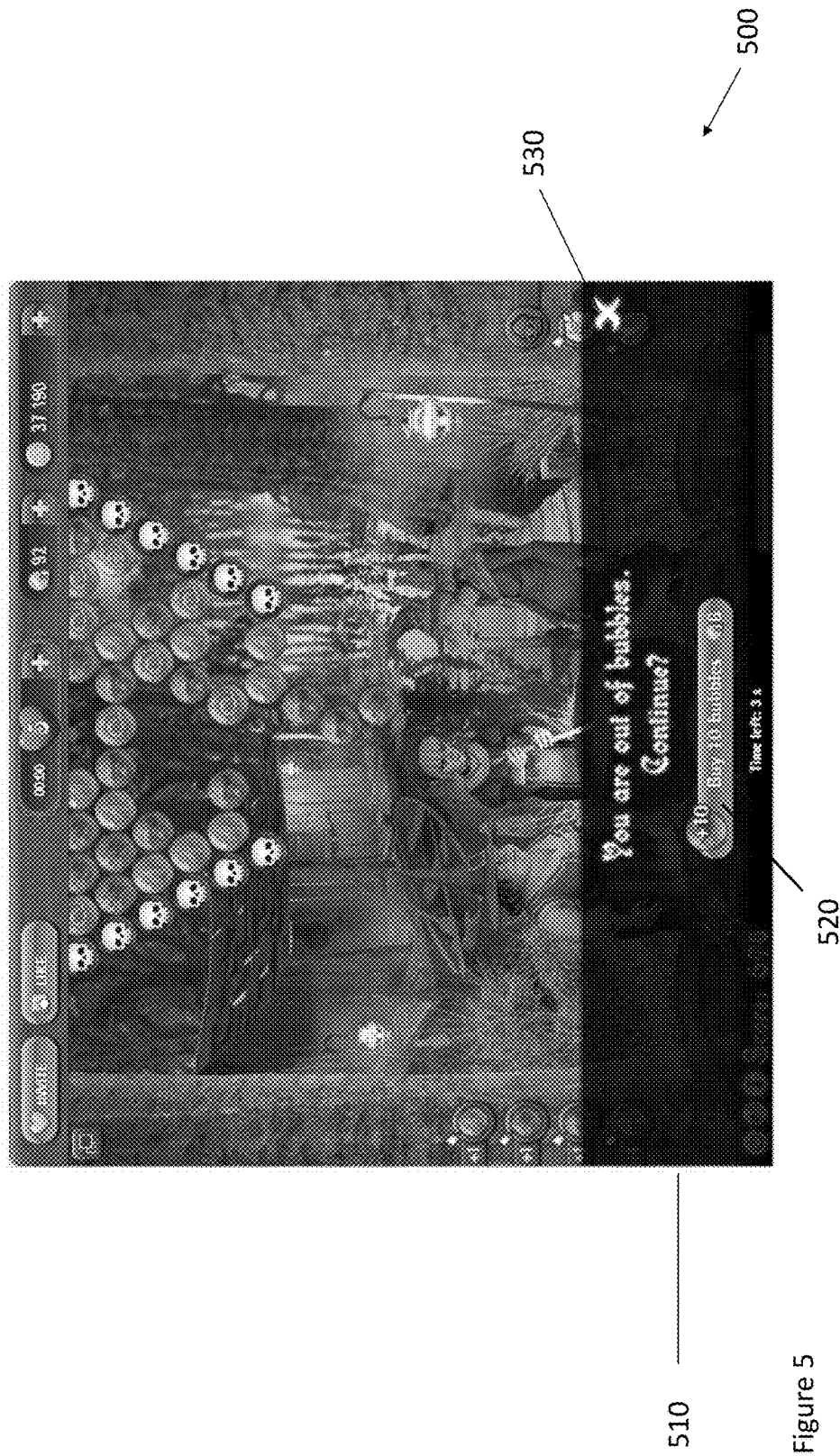
FIG. 5 depicts an example game screen showing a level of a game according to an embodiment.

FIG. 5 shows one example of a level in which it is detected that the number of moves available 440 has reached a predefined value. A message is displayed. The message may inform the user that they have run out of moves or provide similar information. In some embodiments the predefined value is equal to zero, i.e. the message is displayed when the player runs out of moves. However, in some embodiments, the message may be displayed when other numbers of moves are still available. In some embodiments, the message may be triggered by an event, other than number of moves used or remaining.

In the example shown in FIG. 5, the processor controls the display to show a message 501, indicating to the player that there are no possible moves remaining and that to continue gameplay, the player can increase the total number of moves by making a purchase. An icon 520 is shown on the display as part of the message 510. In this example, the player can make no further moves unless they make a purchase to increase the total number of moves available to the player.

If the user selects or otherwise activates the icon using the user interface, the number of available moves may be increased. In response to user input associated with the icon 520 of the message, the processor 115 of the user device may access memory 120 and store a user specific value representing the total number of moves that may be made by the user when playing the level of the game. Alternatively, this may be stored as a value indicating the number of extra moves in addition to the default number of moves. This value may be stored as part of a set of parameters associated with a user account. For example, the parameters are provided in a data structure such as data structure 900 shown in FIG. 8.

In one embodiment, the user device 100 may additionally transmit a message to a server 220, requesting an update to the corresponding information stored for the user in the server side database 250.

In some embodiments, the extra moves may be obtained in response to a payment being made. For example, in response to user input associated with the icon 520 of the message, the user device transmits a request for an increased number of moves over WAN 150 to a remote server, for example, server 220. The request may comprise instructions enabling a remote server to debit an account of the player with a sum of money in exchange for the increase in moves. In some embodiments, the currency is real currency and in other embodiments the currency may be a virtual currency. The request may comprise account identification information, such as a user ID for a social network account, and an indication of the level of the game which is currently in play, for example, level 6.

Upon receiving the request, the server 220 may access the database 250 and use the account identification information as a key into a database 250 to locate the information stored in association with the user account. The server 220 update the data for the user to reflect the additional moves available for the given level. In one embodiment, the user device may await confirmation from the server 220 before the additional moves can be applied. Upon receiving the confirmation from the server 220, the user specific default limit information may be stored and used for the particular level.

By storing the user specific limit value information in memory 120 in association with level information, this new user specific total number of moves available may be applied for the same level in subsequent plays of the level. For example, if after the default limit value is updated to the new user specific limit value during play of the level of game, the processor determines an end game condition (e.g. in response to user input or in response to the move count reaching the new limit value), the new total number of moves available is used when the user replays that level. If the user device then again loads the same level of the game, the total number of moves available will be the user specific total number of moves and not the default number of moves. In this way, the user has a version of the game which is specific to that user. The user does not have to make any changes to the game each time the user plays the game in order to get that version of the game which is specific to the user.

Figure 6:
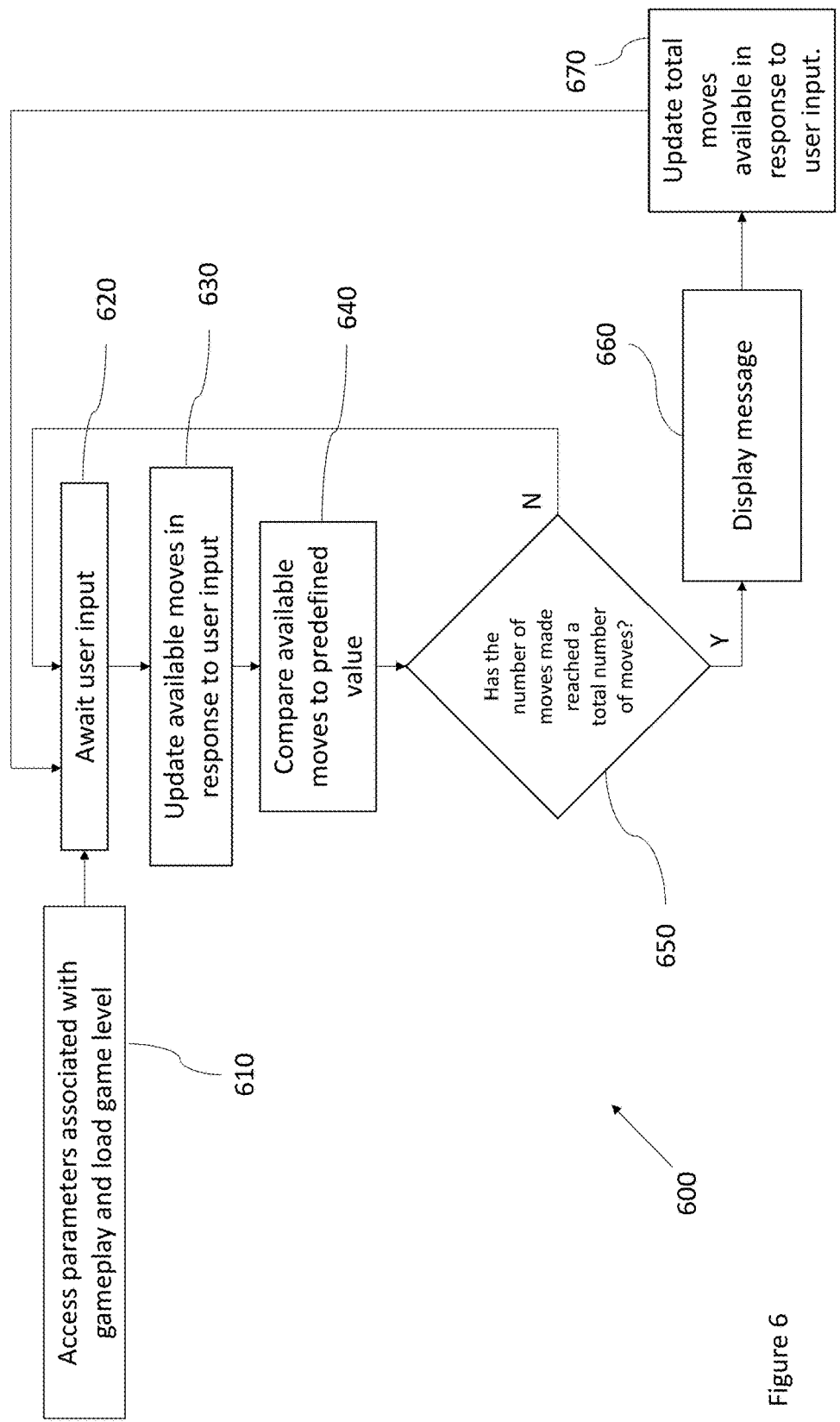
FIG. 6 illustrates a flowchart of a method according to an embodiment.

Reference is now made to FIG. 6, which illustrates a method 600—which may be implemented by user device 100—for determining whether or not the number of moves made has reached a predefined value and therefore whether a consequent message should be displayed.

At step 610, in response to appropriate user input at the input device 165, a level of the game is loaded for play. This step comprises the processor 115 loading from the memory 120, the necessary game data required to play the level. This game data includes for example, game rules, and graphics information. The processor may also access the data stored in memory 120 associated with the user account. This data may comprise one or more parameters determining gameplay characteristics for the level that are specific to the user account. As explained above, the one or more parameters may be stored in a data structure such as data structure 900 shown in FIG. 8. The processor may determine whether or not an updated value for the total number of moves is to be used instead of the default number of moves. If so, the user specific number of move is loaded and applied for the level of the game. If there is no user specific limit value information for the level, the processor 115 will use the default value for the total number of moves available stored in the game data.

In one embodiment, prior to the selection of the level, the memory 120 may comprise all of the necessary parameters, game rules, and graphics information necessary to run the game and no synchronisation with the remote database 250 is necessary. In this case, the processor 115 is configured to execute the instructions and use this information to provide the game. Alternatively, in response to the user input at the input device 165 selecting the level for play, the user device 100 may transmit a request for synchronisation to the server 220, as described above, so as to ensure that the latest version of the parameters and any other necessary information for the level to run are stored in the memory 120. The processor 115 then executes the instructions stored in memory 120 to control the display 155 and audio device 160 and provide the game level.

At step 620, the processor 115 awaits user input.

At step 630, the user input is received at the input device 165 indicating a move to be made. The input device 165, upon receiving the user input may be configured to cause the processor 115 to determine a response. The processor 115 may determine the change in position or velocity of game objects 420 or projectiles 430 on the game board in response to the user input and control the display 155 and audio device 160 to output appropriate visual and audio feedback. A counter or count function is provided to update the number of moves available upon the user making a move. In some embodiments, the function of the counter may be provided by the processor 115 which accesses a value representing the number of available moves stored in the memory 120 and updates this value. In other embodiments, the counter may be provided by hardware other than the processor 115.

At step 640, the processor is configured to compare the total number of moves available (either the default value or the user specific value) and compare this value to the number of moves made.

At step 650, if it is determined that the number of made moves is equal to the total number of available moves. If not the method, the method returns to step 620 where the user device 100 awaits further user input.

If, on the other hand, it is determined by the processor 115 that the made moves is equal to the total number of moves the method proceeds to step 660. In some embodiments, the comparison may instead check if there is a predefined difference between the number of moves made and the total number of moves available.

At step 660, the processor 115 signals the graphics controller 125 to display a message, for example message 510 which asks the user whether they wish to purchase more moves for the level. The graphics controller 125 controls the display 155 to display the message 510. The displayed message 510 may comprise an icon 520. Interaction via the user interface with the icon 520 allows the user to purchase more moves. In response user input associated with the icon 520, the method proceeds to step 670.

In some embodiments, the message displayed in 510 may be displayed when the user is out of moves. In this case, if user input via the input device 165 is not detected by the processor 115 within a predefined time limit then the processor 115 may cause the level to end. Alternatively or additionally, the processor 115 may end the level in response to an alternative form of user input, such as user input associated with a different portion of display 155, such as cross 530.

At step 670, assuming the user has interacted with the icon, via the user interface, the processor 115 updates the number of moves available for that level and the method loops back to step 620. Additionally the processor is configured to store or update user specific limit value information to reflect the additional moves. This information is stored in association with respective level information. The information is stored in memory in the user device and/or in a database on the server side.

After step 670, the method may then proceed back to step 620, where following the increase in the number of moves available, the user may continue playing the game by making another move.

After the level of the game had ended, the method may then proceed back to step 610, where the user device 100 subsequently loads the level of the device. The processor will use the user specific limit value information so the game will now have the user specific total number of moves.

Figure 7:
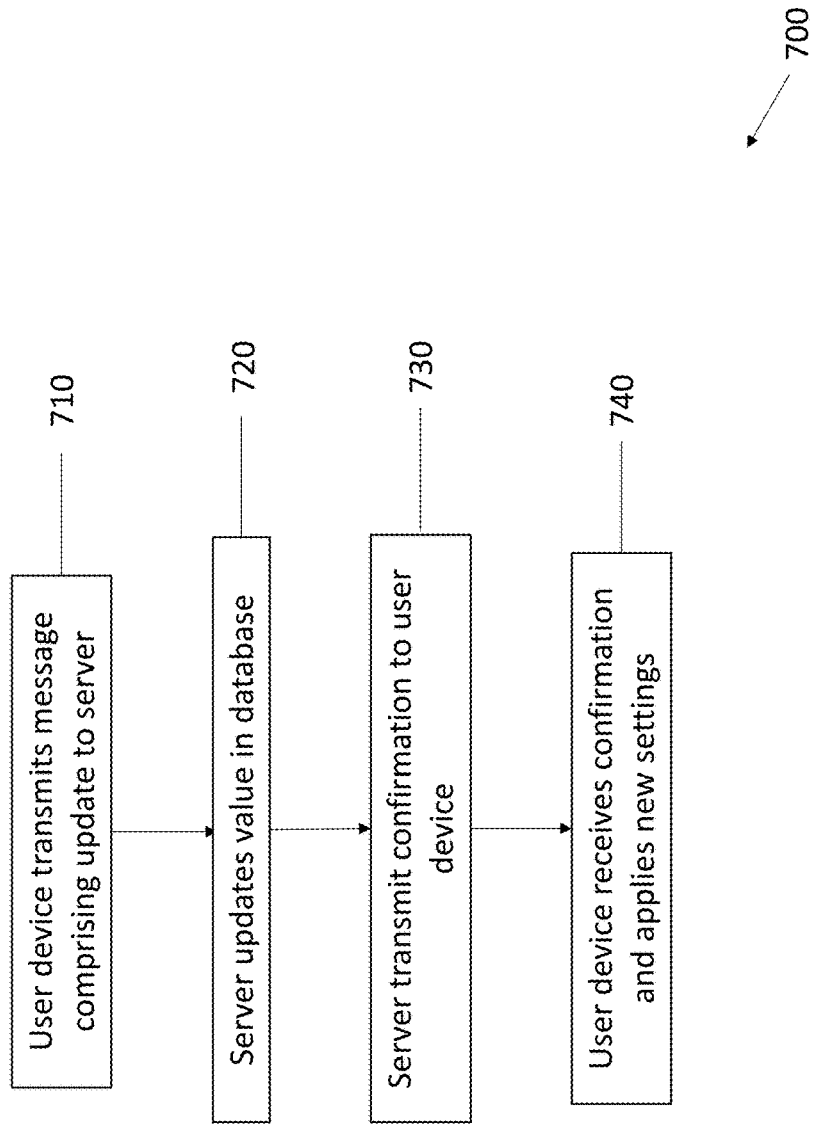
FIG. 7 illustrates a flowchart of a method according to an embodiment.

The user device 100 may transmit the user specific limit value information to the server 220 for storage in a database 250. FIG. 7 shows a method 700 implemented by the user device 100 and server which may be used to update the database 250. In some embodiments, this method 700 may continue on from step 670 of method 600.

At step 710, the processor 115 of the user device generates the request to increase the limit value associated with the particular level of the game in question. The request may comprise user account identification information, level identification information. The request is passed by the processor to the network interface 145 where it is forwarded over the network 210 to the server 220.

The request may comprise an instruction to debit an account of the user. It would be understood that embodiments are not limited to the case where the user makes a cash payment in exchange for an increase to the limit value. In other embodiments, an exchange of virtual currency may be made in exchange for the increase to the limit value. In other embodiments, no transfer of any currency may be required in order to achieve an increase in the limit value.

At step 720, the server 220 receives the request to increase the number of moves available. The server accesses the database 250 and, using the user account identification information from the request as a key, locates a memory location associated with the user account. The data stored in the memory may be updated to include user specific limit value information associated with the extra moves. The server may overwrite previously stored user specific limit value information if the user specific limit value has been updated.

Steps 730 and 740 may optionally be incorporated into the method 700.

These steps are incorporated into the method in the case that the user device 100 is required to receive confirmation that the updated user specific limit value information is stored in the database 250 before the updated user specific limit value information is applied.

At step 730, the server transmits confirmation that the user specific limit value information has been stored in the database 250 to the user device 100.

At step 740, the user device receives this confirmation. In response, the user device 100, the processor 115 may then accesses the memory 120 and writes an indication that the user specific limit value information should be applied for the level. Hence, when the user device 100 subsequently loads the same level of the game, the number of moves that may be made during play of the level will be determined by the user specific limit value information.

In some embodiments the methods illustrated in FIGS. 6, and 7 may be repeated a plurality of times for the same level so as to increase the total number of available moves a number of times. For example, for level 6, the initial total number of available moves stored in memory 120 may be 30. It may be increased to 40 in response to a user input associated with a message. The value for the total number of available moves stored in the memory 120 may then be increased again, this time to 50, in response to a second user input associated with a message in accordance with the method illustrated in FIG. 6. It should be appreciated that the initial total number of moves may of course be more or less than 30. The number of moves by which the initial number of moves is increased may be more or less than 10. It should be appreciated that where there is a further increase of moves, this may be the same as or different from the initial increase of moves.

In other embodiments, the methods illustrated in FIGS. 6, and 7 may be performed only once for a particular level of the game. As described above, the user device 100 updates the user specific limit value information I stored in the memory 120. In this case the user device 100 may determine, on the basis of the presence of the user specific limit value information, that the total number of available moves for a level has been previously updated from an initial value. On the basis of this determination, the user device 100 will not update the user specific limit value information again.

Some embodiments may have the advantage that the maximum number of moves that may be made by a user when playing a level of the game may be modified during the play of a level such that the change to this setting is maintained when the user engages in subsequent play of the same level. This may address some problems that a number of choices or gameplay options from the provider or their partners are offered to a player and these preferences are be applied whenever the user begins a new game or level of a game. Some embodiments allow a gaming system to take account of user preferences for individual levels of a game when that level of the game is subsequently loaded.

Although the embodiments described above relate to updating a limit on the number of moves available to the user during play of a level of the game, it should be appreciated that the embodiments are not so limited. In another embodiment, a time limit value may be stored in memory 120 in association with a level of the game. A timer may be provided as part of the user device, which measures the amount of time elapsed during play of a level of the game. If the elapsed time reaches the time limit the user may be unable to make any further moves and the level may end. The time limit may be updated using a method analogous to that used to update the total number of allowable moves as described above. Specifically, in response to user input, the processor 115 of the device may access memory 120 and store in association with the level information, an indication of a second amount of time. This indication may be stored, for example, at time limit 906 of data structure 900. When the level of the game is subsequently loaded, the time limit applied to the level will comprise the second amount of time and the original time limit.

In additional embodiments, the method may be applied to gameplay parameters other than time limits or moves. For example, the method may be used to update the availability of in-game items for a level.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the methods and device considerations herein are not exhaustive, and that which is described comprises certain embodiments. It is possible to implement the above in a number of variations without departing from the spirit or scope of the invention.

The invention claimed is:

1. A computer implemented method, the method being performed in a computing device comprising one or more processors, a counter, at least one memory, a display configured to display computer game graphics for a computer game, said computer game having one or more levels, the method being performed by executing computer code on the one or more processors to perform the steps of:
   (a) providing a default limit value for use by a user of said computer game;
   (b) for a first play of a given level of the computer game:
      (i) displaying, on a display, a game area, the game area having a plurality of game objects configured to be controlled by the one or more processors in response to a first user input;
      (ii) in response to a second user input associated with at least one of the plurality of game objects, said second user input defining a move of said computer game, using the counter to change a move count, wherein no additional moves can be made if a number of moves made reaches the default limit value; and
      (iii) responsive to a third user input, providing a first set of further moves for use during said first play and a second play of the given level of the computer game;
   (c) determining a first limit value by adding the first set of further moves to the default limit value; and
   (d) for the second play of the given level of the computer game:
      (i) replacing the default limit value with the first limit value;
      (ii) displaying, on the display, the game area, the game area having the plurality of game objects configured to be controlled by the one or more processors in response to a fourth user input; and
      (iii) in response to a fifth user input associated with at least one of the plurality of game objects, said fifth user input defining a move of said computer game, using the counter to change the move count, wherein no additional moves can be made if a number of moves made reaches the first limit value.

2. The method as claimed in claim 1, wherein the computer game comprises a plurality of levels, said first set of further moves being provided for a particular level.

3. The method as claimed in claim 2, comprising storing information associated with said first set of further moves in association with information on the particular level.

4. The method as claimed in claim 1, comprising storing said information associated with said first set of further moves in association with identification information associated with the user.

5. The method as claimed in claim 1, comprising causing information to be sent to a server for storing in a server side database.

6. The method as claimed in claim 1, comprising displaying a message on said display when a difference between the default limit value and the number of moves made is a predetermined value, said message providing information associated with obtaining said first set of further moves.

7. The method as claimed in claim 6, comprising displaying said message with an icon which is selectable by the third user input, said first set of further moves being provided in response to selection of said icon.

8. The method as claimed in claim 6, wherein said predetermined value is zero.

9. The method as claimed in claim 1, comprising, in a subsequent playing of said game:
controlling the display to show the game area;
in response to user input associated with at least one of the plurality of game objects, said user input defining a move of said game, using the counter to change the move count, wherein no additional moves can be made if the number of moves made reaches the first limit value;
responsive to a second further user input, providing a second set of further moves; and
storing, in said memory by the one or more processors, information associated with said second set of further moves such that when said game is played again the first limit value is replaced by a second limit value, said second limit value comprising the sum of the first limit value of moves and the second set of further moves.

10. The method as claimed in claim 1, wherein the first set of further moves comprises one or more further moves.

11. A computing device adapted to play a computer game, the device including one or more processors, a counter, at least one memory, a display configured to display computer game graphics for a computer game, said computer game having one or more levels, and in which the one or more processors execute computer code to perform the steps of:
(a) providing a default limit value for use by a user of said computer game;
(b) for a first play of a given level of the computer game:
(i) controlling the display to show a game area, the game area having a plurality of game objects configured to be controlled by the one or more processors in response to a first user input;
(ii) in response to a second user input associated with at least one of the plurality of game objects, said second user input defining a move of said computer game, using the counter to change a move count, wherein no additional moves can be made if a number of moves made reaches the default limit value; and
(iii) responsive to a third user input, providing a first set of further moves for use during said first play and a second play of the given level of the computer game;
(c) determining a first limit value by adding the first set of further moves to the default limit value; and
(d) for the second play of the given level of the computer game:
(i) replacing the default limit value with the first limit value;
(ii) displaying, on the display, the game area, the game area having the plurality of game objects configured to be controlled by the one or more processors in response to a fourth user input; and
(iii) in response to a fifth user input associated with at least one of the plurality of game objects, said fifth user input defining a move of said computer game, using the counter to change the move count, wherein no additional moves can be made if a number of moves made reaches the first limit value.

12. A non-transitory computer readable medium encoded with instructions for controlling a computing device comprising one or more processors, a counter, at least one memory, a display configured to display computer game graphics for a computer game, said computer game having one or more levels, and in which the instructions are executed on the one or more processors to perform the steps of:
(a) providing a default limit value for use by a user of said computer game;
(b) for a first play of a given level of the computer game:
(i) controlling the display to show a game area, the game area having a plurality of game objects configured to be controlled by the one or more processors in response to a first user input;
(ii) in response to a second user input associated with at least one of the plurality of game objects, said second user input defining a move of said computer game, using the counter to change a move count, wherein no additional moves can be made if a number of moves made reaches the default limit value; and
(iii) responsive to a third user input, providing a first set of further moves for use during said first play and a second play of the given level of the computer game;
(c) determining a first limit value by adding the first set of further moves to the default limit value; and
(d) for the second play of the level of the computer game:
(i) replacing the default limit value with the first limit value
(ii) displaying, on the display, the game area, the game area having the plurality of game objects configured to be controlled by the one or more processors in response to a fourth user input; and
(iii) in response to a fifth user input associated with at least one of the plurality of game objects, said fifth user input defining a move of said computer game, using the counter to change the move count, wherein no additional moves can be made if a number of moves made reaches the first limit value.

\* \* \* \* \*